US007185106B1

(12) United States Patent
Moberg et al.

(10) Patent No.: US 7,185,106 B1
(45) Date of Patent: Feb. 27, 2007

(54) PROVIDING SERVICES FOR MULTIPLE VIRTUAL PRIVATE NETWORKS

(75) Inventors: Kenneth A Moberg, Boulder Creek, CA (US); Steven Lin, Cupertino, CA (US); Spencer Greene, Palo Alto, CA (US); James Murphy, San Ramon, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 713 days.

(21) Appl. No.: 10/298,696

(22) Filed: Nov. 15, 2002

(51) Int. Cl.
*G06F 15/173* (2006.01)

(52) U.S. Cl. ............... 709/238; 709/242; 709/245; 370/351; 370/355; 370/392

(58) Field of Classification Search ........ 709/217–219, 709/227–229, 203, 223, 242, 245, 238; 370/351, 370/355, 356, 397, 395.31
See application file for complete search history.

(56) References Cited

U.S. PATENT DOCUMENTS

| | | | | |
|---|---|---|---|---|
| 6,205,488 B1 * | 3/2001 | Casey et al. | ............... | 709/238 |
| 6,286,047 B1 * | 9/2001 | Ramanathan et al. | ....... | 709/224 |
| 6,516,417 B1 * | 2/2003 | Pegrum et al. | ............... | 726/15 |
| 6,526,056 B1 * | 2/2003 | Rekhter et al. | ............. | 370/392 |
| 6,594,704 B1 * | 7/2003 | Birenback et al. | .......... | 709/238 |
| 6,732,211 B1 * | 5/2004 | Goyal et al. | ................. | 710/261 |
| 6,754,181 B1 * | 6/2004 | Elliott et al. | ................. | 370/252 |
| 6,789,118 B1 * | 9/2004 | Rao | .......................... | 709/225 |
| 6,895,429 B2 * | 5/2005 | Banga et al. | ................ | 709/215 |
| 6,909,708 B1 * | 6/2005 | Krishnaswamy et al. | ... | 370/352 |
| 6,948,003 B1 * | 9/2005 | Newman et al. | ............ | 709/250 |
| 6,985,937 B1 * | 1/2006 | Keshav et al. | ............. | 709/223 |
| 7,039,687 B1 * | 5/2006 | Jamieson et al. | ........... | 709/220 |

* cited by examiner

*Primary Examiner*—Saleh Najjar
*Assistant Examiner*—Faruk Hamza
(74) *Attorney, Agent, or Firm*—Shumaker & Sieffert, P.A.

(57) ABSTRACT

A network device provides services for multiple virtual private networks (VPNs) via one or more virtual hosts. For example, a router receives packets from multiple VPNs, and communicates the packets to a service card via a logical interface in accordance with a forwarding information base. A virtual host within the service card processes the packets and provides a service for the network device from which the packet was sent. The virtual host may, for example, provide print services for network devices within a corresponding VPN. The virtual host acts, in essence, as a print server within the corresponding VPN. In this manner, the router may eliminate the need for the customer associated with the VPN to maintain print servers within remote customer sites.

29 Claims, 6 Drawing Sheets

PROVIDING SERVICES FOR MULTIPLE VIRTUAL PRIVATE NETWORKS

TECHNICAL FIELD

The invention relates to computer networks and, more particularly, to communication through computer networks via virtual private networks (VPNs).

BACKGROUND

A computer network is a collection of interconnected computing devices that exchange data and share resources. In a packet-based network, such as the Internet, the computing devices communicate data by dividing the data into small blocks called packets. The packets are individually routed across the network from a source device to a destination device. The destination device extracts the data from the packets and assembles the data into its original form. Dividing the data into packets enables the source device to resend only those individual packets that may be lost during transmission.

Certain devices within the network, referred to as routers, maintain tables of routing information that describe available routes through the network. Each route defines a path between two locations on the network. Upon receiving an incoming data packet, the router examines header information within the packet to identify the destination for the packet. Based on the header information, the router accesses the routing table, selects an appropriate route for the packet and forwards the packet accordingly.

Virtual private networks (VPNs) are private data networks used to share data between two remotely located computing devices. VPNs may, for example, make use of a public network infrastructure, such as the Internet. For instance, a company with two different sites may securely transmit data between the two different sites via a VPN. VPNs may include numerous servers and other devices that provide services to host devices within a particular VPN. For example, a print server may provide printing services to the host devices within the VPN.

SUMMARY

In general, the invention is directed to techniques for providing services to network devices within multiple virtual private networks (VPNs) via one or more virtual hosts. In particular a service card within a router provides an operating environment for one or more virtual hosts. The virtual hosts each operate as an independent network device within a corresponding one of the VPNs to provide services to other network devices within the corresponding VPNs. The virtual hosts may, for example, be assigned an Internet Protocol (IP) address within the subnet scope of IP addresses belonging to the corresponding VPNs of a customer. For example, a first virtual host may be assigned an IP address within a first subnet scope belonging to a first virtual private network of a first customer. A second virtual host may be assigned an IP address within a second subnet scope belonging to a second virtual private network of a second customer. The first virtual host may provide services to network devices within the first VPN and the second virtual host may provide services to network devices within the second VPN. The virtual hosts, for example, may provide services such as authentication services, print services, file-sharing services, network address translation (NAT) services, and domain name system (DNS) services. In this manner, the router provides services to network devices within multiple VPNs.

The router may relay data, such as packets, to and from the service card and, in turn, to and from the virtual hosts. To relay packets to and from the service card, the router may make use of a set of logical interfaces. In particular, the router may construct an input logical interface and an output logical interface for each virtual host. In this manner, the service card may correspond to a set of input logical interfaces and output logical interfaces. Packets for different VPNs traverse to and from the service card via different input and output logical interfaces. For all extensive purposes, such as forwarding and routing, the logical interfaces may be treated in a manner similar to physical interfaces to other network devices. Consequently, router may view the service card as providing services to a number of different networks, as if the service card were a node in multiple networks.

In order to reduce the amount of resources necessary for servicing the VPNs, the router may dynamically instantiate input and output logical interfaces. The router may communicate information to and from the service card via the instantiated logical interfaces, and destruct the logical interfaces upon completion of communications.

In one embodiment, the invention provides a network device comprising a control unit to receive data from a network. The network device further comprises a virtual host associated with the network by the control unit to process the data and operate as a network device within the network.

In another embodiment, the invention provides a network device comprising a plurality of virtual hosts that operate as network devices within different networks. The network device further comprises a control unit to receive data from the networks, and distribute the data to the virtual hosts for processing.

In another embodiment, the invention provides a network device comprising a plurality of interfaces to receive data from multiple virtual private networks. The network device further comprises a service element to provide an operating environment for one or more virtual hosts, wherein each virtual host operates as a network device within one of the virtual private networks to process the received data and provide a service to another network device within the respective virtual private network.

In another embodiment, the invention provides a method comprising receiving data flows from multiple virtual private networks. The method further comprises providing an operating environment for one or more virtual hosts, wherein each virtual host operates as a network device within one of the virtual private networks. The method further includes processing the data flows via the virtual hosts to provide a service to another network device within the respective virtual private network via the virtual hosts.

In another embodiment, the invention provides a method comprising receiving data from multiple virtual private networks via a plurality of interfaces of a router. The method further comprises dynamically instantiating a logical interface for the data to a service element. The method also includes forwarding the data to the service element via the logical interface and processing the data with the service element for the virtual private networks.

In another embodiment, the invention provides a computer-readable medium comprising instructions to cause a processor to receive data flows from multiple virtual private networks. The computer-readable medium further comprises instructions to cause the processor to provide an operating environment for one or more virtual hosts, wherein each virtual host operates as a network device within one of the virtual private networks. The computer-readable medium also includes instructions to cause the processor to process the data flows via the virtual hosts to provide a service to another network device within the respective virtual private network via the virtual hosts.

The invention may provide one or more advantages. For example, the described techniques may allow a router to provide services to network devices within multiple VPNs. A service provider, for example, may incorporate such a router to provide print services for a plurality of VPNs. In this manner, the router provided by the service provider may eliminate the need for each customer to maintain print servers at each remote site. Furthermore, the techniques may allow a control unit within the router to utilize logical interfaces for relaying packets for multiple networks to, and receiving packets from, one or more service cards for servicing the VPNs. Furthermore, the router may dynamically instantiate and destruct the logical interfaces as necessary to support the current VPNs being serviced. Accordingly, the techniques may reduce the resources necessary for servicing the VPNs.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
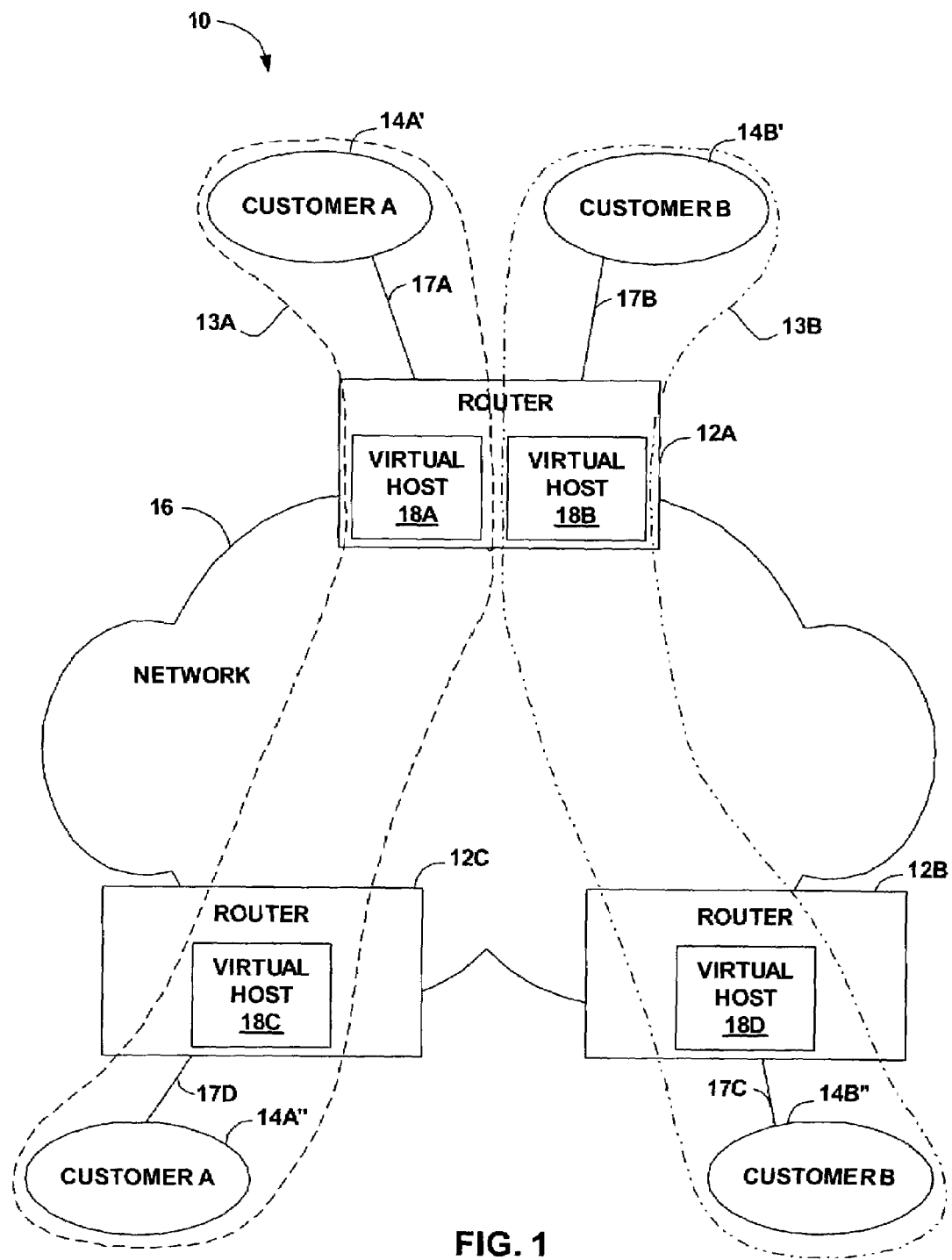
FIG. 1 is a block diagram illustrating an example system in which routers provide services for multiple virtual private networks (VPNs) in accordance with the principles of the invention.

FIG. 1 is a block diagram illustrating an example system 10 in which routers 12A–12C ("routers 12") provide services for virtual private networks 13A and 13B ("VPNs 13") in accordance with the principles of the invention. Routers 12 couple customer site networks 14A and 14B ("customer sites 14") to a public network 16. Public network 16 includes one or more autonomous systems (not shown) having a number of devices, such as routers and switches, used to forward packets across public network 16.

Customer site networks 14 may be geographically distributed sites of multiple customers. In the example of FIG. 1, customer site networks 14 include customer site networks for two customers: customer A and customer B. For example, customer A includes customer site networks 14A' and 14A". Each of customer site networks 14 includes one or more devices (not shown), such as personal computers, laptop computers, handheld computers, workstations, servers, routers, switches, printers, fax machines, or the like. Customer site networks 14 may include one or more Local Area Networks (LANs), Wide Area Network (WANs), or the like. Although system 10 may include any number of customer site networks 14 coupled to public network 16 by any number of routers 12, FIG. 1, for simplicity, shows only customer site networks 14 coupled to public network 16 by routers 12. Each of customer site networks 14 connects to routers 12 via one or more access links 17A–D ("access links 17").

Customer site networks 14 may transmit data flows between associated customers site networks 14 via corresponding VPNs 13. For example, customer A may transmit data flows between customer site network 14A' and customer site network 14A" via VPN 13A. In the same manner, customer site network 14B' may transmit data flows to customer site 14B" via VPN 13B.

In general, routers 12 provide services for customer site networks 14. Routers 12 may, for example, provide services for VPNs 13 and, in turn, for multiple customers. Routers 12 may include one or more virtual hosts 18. Each of virtual hosts 18 operates as an independent network device within a corresponding one of VPNs 13 to provide services to other network devices within the corresponding VPN 13. For example, each of virtual hosts 18 may be assigned an Internet Protocol (IP) address within the subnet of IP addresses belonging to the corresponding VPN 13 of a customer. In the example of FIG. 1, router 12A includes virtual hosts 18A and 18B. Virtual host 18A corresponds to customer A and, more particularly to VPN 13A. Virtual host 118B corresponds to customer B and, more particularly to VPN 13B. Router 12A may, for example, provide print services to customer A and customer B via VPNs 13A and 13B, respectively. In this manner, router 12 eliminates the need for customer A and customer B to maintain devices to provide services at each remote customer site. Other services the routers 12 may provide include authentication services, file-sharing services, network address translation (NAT) services, domain name system (DNS) services, and the like.

Routers 12 may relay data, such as packets, to and from virtual hosts 18. Virtual hosts 18 may, for example, reside within one or more service cards (not shown) within routers 12. The service cards provide services for VPNs 13. To relay packets to and from the service cards, routers 12 may make use of a set of logical interfaces. In particular, routers 12 may construct an input logical interface and an output logical interface for each virtual host 18. In this manner, each service card may correspond to a set of input logical interfaces and output logical interfaces. Packets for different VPNs 13 traverse to and from the service cards via different input and output logical interfaces. For all extensive purposes, such as forwarding and routing, the logical interfaces may be treated in a manner similar to physical interfaces to other network devices. Consequently, routers 12 may view the service cards as providing services to a number of different networks, as if the service cards were nodes in multiple networks.

In order to reduce the amount of resources necessary for servicing VPNs 13, routers 12 may dynamically instantiate input and output logical interfaces. Routers 12 may communicate information to and from the service cards via the instantiated logical interfaces, and destruct the logical interfaces upon completion of communications.

Figure 2:
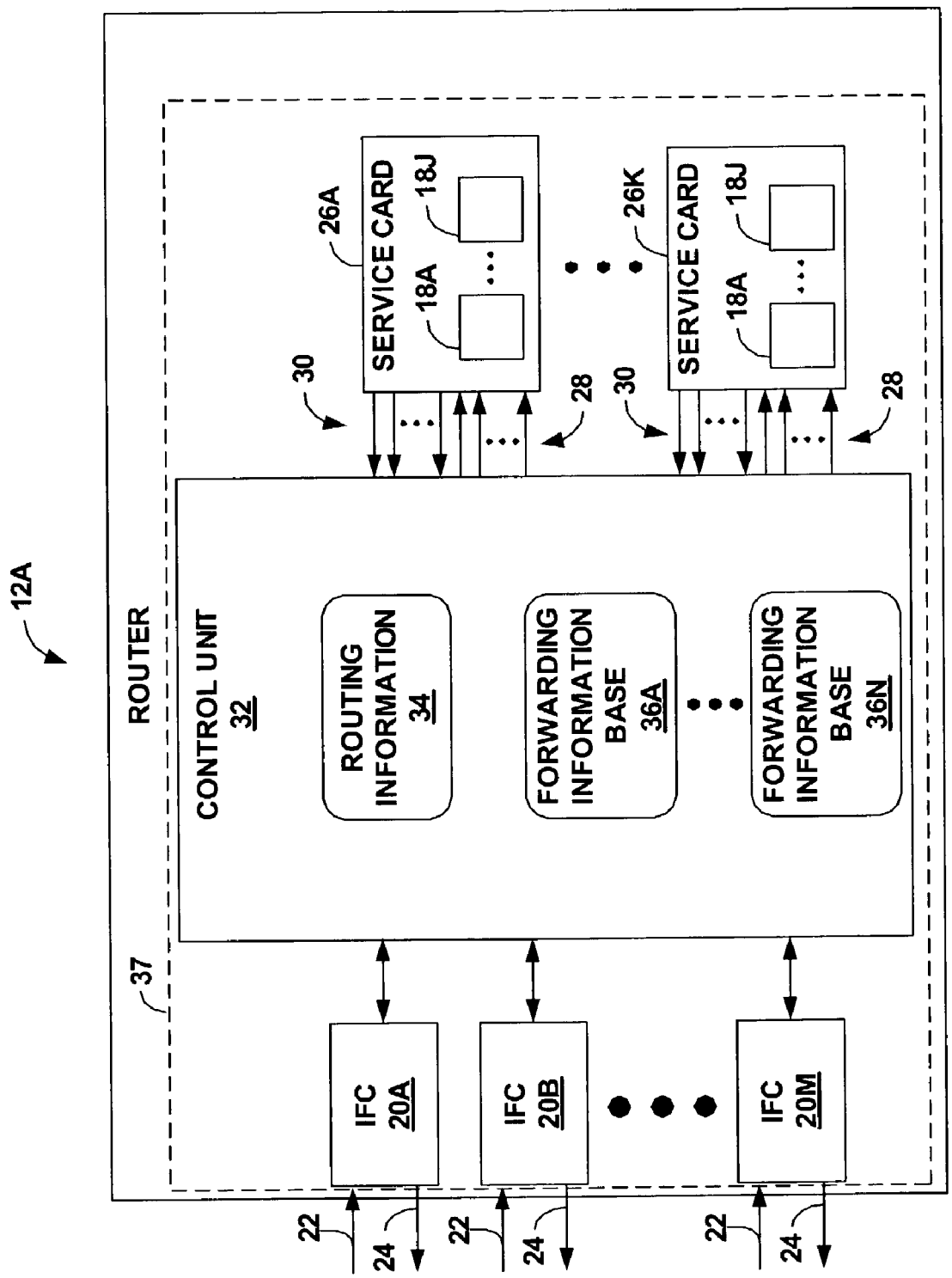
FIG. 2 is a block diagram illustrating an exemplary router that provides services to multiple networks.

FIG. 2 is a block diagram illustrating an exemplary router, such as router 12A, that provides services to multiple networks, such as VPNs 13. In particular, router 12A provides services to a number of different networks, as if the router 12A were a node in multiple networks.

Router 12A includes interface cards 20A–20M ("IFCs 20") that receive and send packets via network links 22 and 24, respectively. IFCs 20 may be coupled to network links 22, 24 via a number of interface ports. In addition, router 12A includes service cards 26A–26K ("service cards 26") that provide services to multiple customer networks, such as customer site networks 14 and, more particularly VPNs 13. A number of input logical interfaces 28 and output logical interfaces 30 may couple service cards 26 to a control unit 32.

Each of service cards 26 may further include one or more virtual hosts 18A–18J ("virtual hosts 18"). As described above, each of virtual hosts 18 operates as an independent network device within one of VPNs 13 to provide services to other network devices within the respective VPN 13. For example, each of virtual hosts 18 may be assigned an Internet Protocol (IP) address within the subnet of IP addresses belonging to the corresponding VPN 13 of a customer. In this manner, router 12A appears as a node within multiple networks.

Control unit 32 maintains routing information 34, which describes the topology of network 16. In particular, routing information 34 describes various routes within network 16, and the appropriate next hops for each route, i.e., the neighboring devices of router 12A along each of the routes. Control unit 32 analyzes routing information 34 and generates forwarding information bases 36A–36N ("forwarding information bases 36"). Forwarding information bases 36 may associate, for example, network destinations with specific next hops and corresponding IFCs 20 or service cards 26. Forwarding information bases 36 may, therefore, be thought of as a variation of routing information 34. Control unit 32 may maintain separate forwarding information bases 36 respectively associated with each of VPNs 13. In this manner, control unit 32 may associate virtual hosts 18 with respective VPNs 13.

Router 12A may further include a chassis 37 for housing control unit 32. Chassis 37 has a number of slots (not shown) for receiving a set of cards, including interface cards (IFCs) 20 and service cards 26. Each card may be inserted into a corresponding slot of chassis 37 for electrically coupling the card to control unit 32 via a bus, backplane, or other electrical communication mechanism.

Control unit 32 receives a packet from IFCs 20, and associates the packet with a corresponding one of forwarding information bases 36. For example, router 12A may identify which one of IFCs 20 received the packet, and associate the packet with one of forwarding information bases 36 based on which one of IFCs 20 received the packet. Alternatively, router 12A may associate the packet with one of forwarding information bases 36 based on the subnet scope of an IP source address, IP destination address, or other path information within or appended to the packet. Router 12A relays the packet to the next hop in accordance with the associated one of forwarding information bases 36.

In the case in which the next hop is one of service cards 26, control unit 32 relays the packet to the indicated one of service cards 26. In this manner, control unit 32 forwards packets to service cards 26 as if service cards 26 are nodes within customer networks 14. Control unit 32 may selectively choose which one of service cards 26 to relay the packet. Control unit 32 may, for example, select the one of service cards 26 that has the most available bandwidth. Alternatively, one of service cards 26 may service a portion of VPNs 13 while other service cards 26 service other portions of VPNs 13. Further, control unit 32 may select a particular one of service cards 26 depending on what kind of service is to be performed on the packet. For example, one of service cards 26 may provide authentication services while another one of service cards 26 may provide NAT services.

Control unit 32 may relay the packet to service cards 26 via one of input logical interfaces 28. Control unit 32 may statically maintain logical interfaces 28, 30. For example, router 12A may maintain a configuration file (not shown) that defines the logical interfaces 28, 30 between control unit 32 and service cards 26. Upon startup, control unit 32 may access the configuration file and instantiate the defined logical interfaces 28, 30. The configuration file may further associate logical interfaces with particular customers and, more particularly with particular VPNs 13. In this manner, control unit 32 may map logical interfaces 28, 30 to forwarding information bases 36 corresponding to VPNs 13. Further, control unit 32 may map logical interfaces 28, 30 to virtual hosts 18 within service cards 26 in the same manner as forwarding information bases 36.

Further, control unit 32 may dynamically instantiate logical interfaces 28, 30 between control unit 32 and service cards 26 to support serviced VPNs 13. For example, control unit 32 may identify the next hop of a packet to be one of service cards 26 in which no logical interfaces 28, 30 couple service cards 26 to control unit 32. Control unit 32 may instantiate one of input logical interfaces 28 and one of outbound logical interfaces 30 to couple control unit 32 with a particular one of service cards 26. Control unit 32 may map the instantiated logical interfaces 28, 30 to a corresponding forwarding information base 36, a corresponding virtual host, or both. Upon ending communications with a particular one of service cards 26, control unit 32 may destruct the pair of instantiated logical interfaces 28, 30 between that service card and control unit 32. Dynamically instantiating and destructing logical interfaces 28, 30 between control unit 32 and service cards 26 reduces the number of logical interfaces 28, 30 that must be maintained by control unit 32, therefore reducing the number of resources necessary to service VPNs 13.

Upon receiving a packet from control unit 32, service cards 26 associate the packet with a particular one of virtual hosts 18. For example, the destination address of the packet may correspond to the IP address assigned to the respective one of virtual hosts 18. Alternatively, service cards 26 may associate the received packet with the virtual hosts based on the one of input logical interfaces 28 that received the packet.

Upon identifying one of virtual hosts 18 associated with the packet, identified virtual host processes the packet, and provides services for other network device within VPN 13 that sent the packet. For example, each of virtual hosts 18 may provide authentication services for mobile telephone user requesting access to a VPN. In the case in which one of virtual hosts 18 provides authentication services, the virtual host may originate VPN traffic for a radius server within the one of VPNs 13 to which the mobile user requests access in order to determine whether to grant the mobile user access to the VPN. Virtual hosts 18 may further receive traffic destined for the assigned IP address and process the traffic. In this manner, each of virtual hosts 18 acts as a source device and a destination device within the associated one of VPNs 13. Alternatively, each of virtual hosts 18 may originate traffic not in response to receiving a packet. For example, each of virtual hosts 18 may periodically send messages to network devices within the corresponding one of VPNs 13 in order to determine the state of the device.

Service cards 26 relay the VPN traffic originated by virtual hosts 18 to control unit 32. Control unit 32 identifies the appropriate forwarding information base 36 associated with the packet. Control unit 32 may associate the packet with a corresponding one of forwarding information bases 36 using a mapping of logical interfaces 28, 30 to forwarding information bases 36. Alternatively, other packet information may be used to select one of information forwarding bases 36. For example, path information appended to the packet, such as one or more parts of a label, may be used to identify the corresponding one of forwarding information bases 36 associated with the packet. Control unit 32 forwards the packet in accordance with the identified one of forwarding information bases 36.

Router 12A may operate according to executable instructions fetched from a computer-readable medium (not shown). Examples of such media include random access memory (RAM), read-only memory (ROM), non-volatile random access memory (NVRAM), electrically erasable programmable read-only memory (EEPROM), flash memory, and the like. The functions of router 12A may be implemented by executing the instructions of the computer-readable medium with one or more processors, discrete hardware circuitry, firmware, software executing on a programmable processor, or a combination of any of the above.

Figure 3:
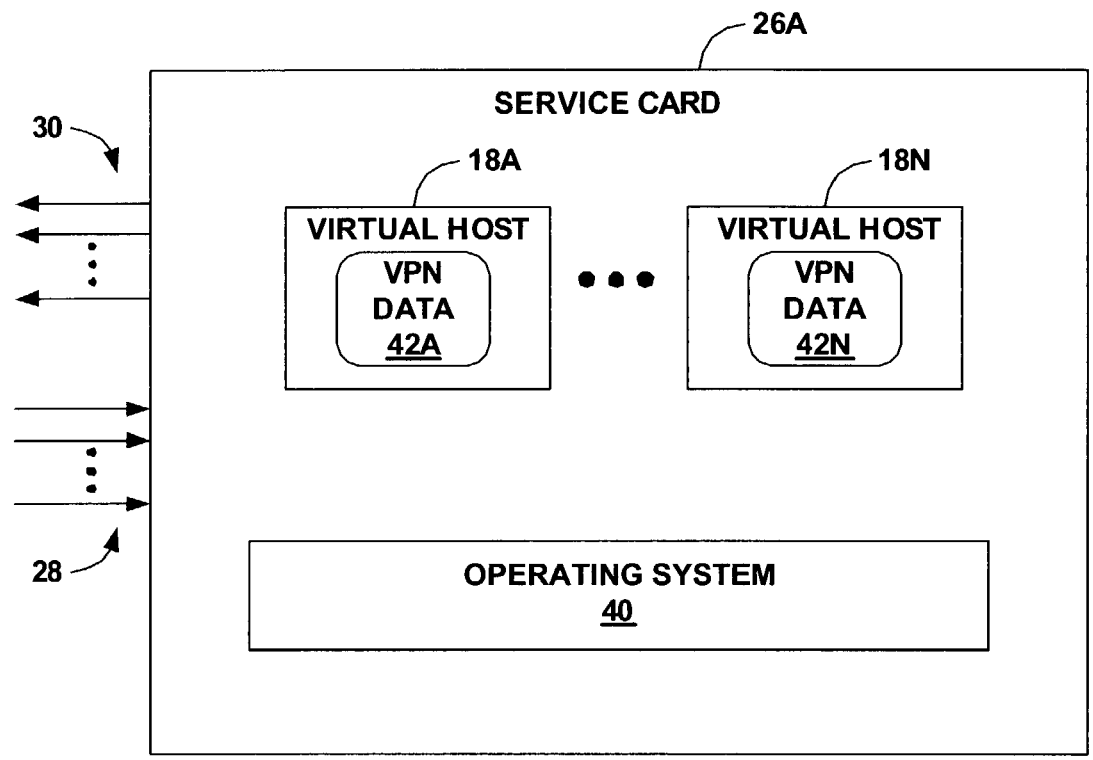
FIG. 3 is an exemplary embodiment of a service card that provides services to network devices within multiple VPNs in accordance with the principles of the invention.

FIG. 3 is an exemplary embodiment of a service card 26A that provides services to network devices within multiple VPNs in accordance with the principles of the invention. Service card 26A includes an operating system 40 that provides a multi-tasking operating environment for execution of a number of concurrent processes. An example of such an operating system is FreeBSD, which is an advanced UNIX operating system that is compatible with a number of programmable processors, including processors commercially available.

Service card 26A includes virtual hosts 18A–18N ("virtual hosts 18") that control the services provided by service card 26A. Each of virtual hosts 18 may be a process running on operating system 40. Alternatively, virtual hosts 28 may be a single process. Virtual hosts 18 may include VPN data 42A–42N, respectively, that may contain specific information for the corresponding one of VPNs 13 associated with virtual hosts 18. For example, VPN data 42A may include cryptographic information associated with VPN 13A, a corresponding one of output logical interfaces 30, a VPN label to attach to the output packet, a radius server for authentication, domain name information, and the like.

Service card 26A receives inbound packets from control unit 32. Service card 26A may receive inbound packets via input logical interfaces 28. Alternatively, service card 26A may receive inbound packets from a physical interface. Service card 26A associates the inbound packet with a particular one of virtual hosts 18. As mentioned above, the destination address of the packet may correspond to an IP address assigned to the respective one of virtual hosts 18. For example, if virtual host 18A is associated with the packet, virtual host 18A processes the packet and, provides a service associated with the packet. For instance, virtual host 18A may provide print services to network devices within the corresponding one of VPNs 13. Virtual host 18A may receive a print request from a host device within a respective one of customer site networks 14 of the corresponding one of VPNs 13. Virtual host 18A, in this case acts like a print server, and generates a print request and sends the print request to a printing device within the corresponding one of VPNs 13 via control unit 32. Virtual host 18A may access VPN data 42A to obtain information regarding the corresponding one of VPNs 13. For example, VPN data 42A may further identify a corresponding one of output logical interfaces 30 associated with the VPN, a VPN label associated with the VPN, or the like.

Figure 4:
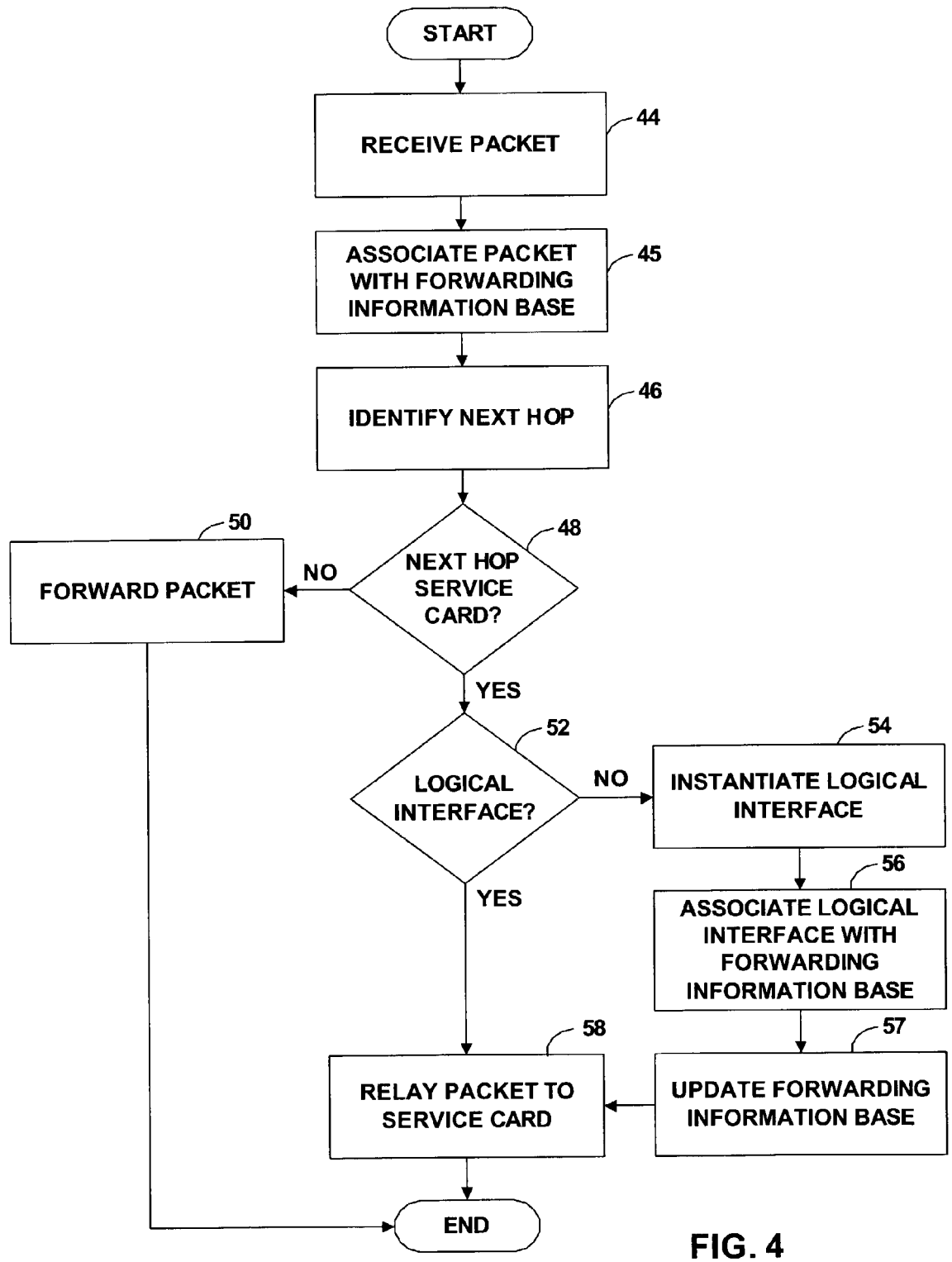
FIG. 4 is a flowchart illustrating an exemplary mode of operation of a router instantiating logical interfaces in accordance with the principles of the invention.

FIG. 4 is a flowchart illustrating an exemplary mode of operation of exemplary router 12A instantiating logical interfaces in accordance with the principles of the invention. Router 12A receives a packet (44), e.g., from one of IFCs 20 or service cards 26, and associates the packet with a corresponding one of forwarding information bases 36 (46). Router 12A may associate the packet with one of forwarding information bases 36 based on the interface on which the packet was received. Alternatively, control unit 32 may extract information from or appended to the packet to identify a particular one of forwarding information bases 36.

Control unit 32 may identify the next hop of the packet from particular one of forwarding information bases 36 associated with the packet (46), and determine whether the next hop is one of service cards 26 (48). When the next hop for the packet is not one of service cards 26, control unit 32 forwards the packet in accordance with the associated one of forwarding information bases 36 (50). For instance, control unit 32 may receive a packet from one of customer sites 14, and forward the packet to network 16 without providing any services to the packet.

When the next hop of the packet is one of service cards 26, control unit 32 determines whether logical interfaces 28, 30 exist between control unit 32 and the one of service cards 26 corresponding to the next hop (52). When logical interfaces 28, 30 do not exist between control unit 32 and the service card, control unit 32 instantiates one of input logical interfaces 28 and one of output logical interfaces 30 (54). Control unit 32 further associates the instantiated logical interfaces 28, 30 with one of forwarding information bases 36 (56). Control unit 32 may update the associated forwarding information base 36 to include the instantiated logical interfaces 28, 30 (57). Control unit 32 relays the packet to the particular one of service cards 26 via the particular one of input logical interfaces 28 associated with the service card (58).

Figure 5:
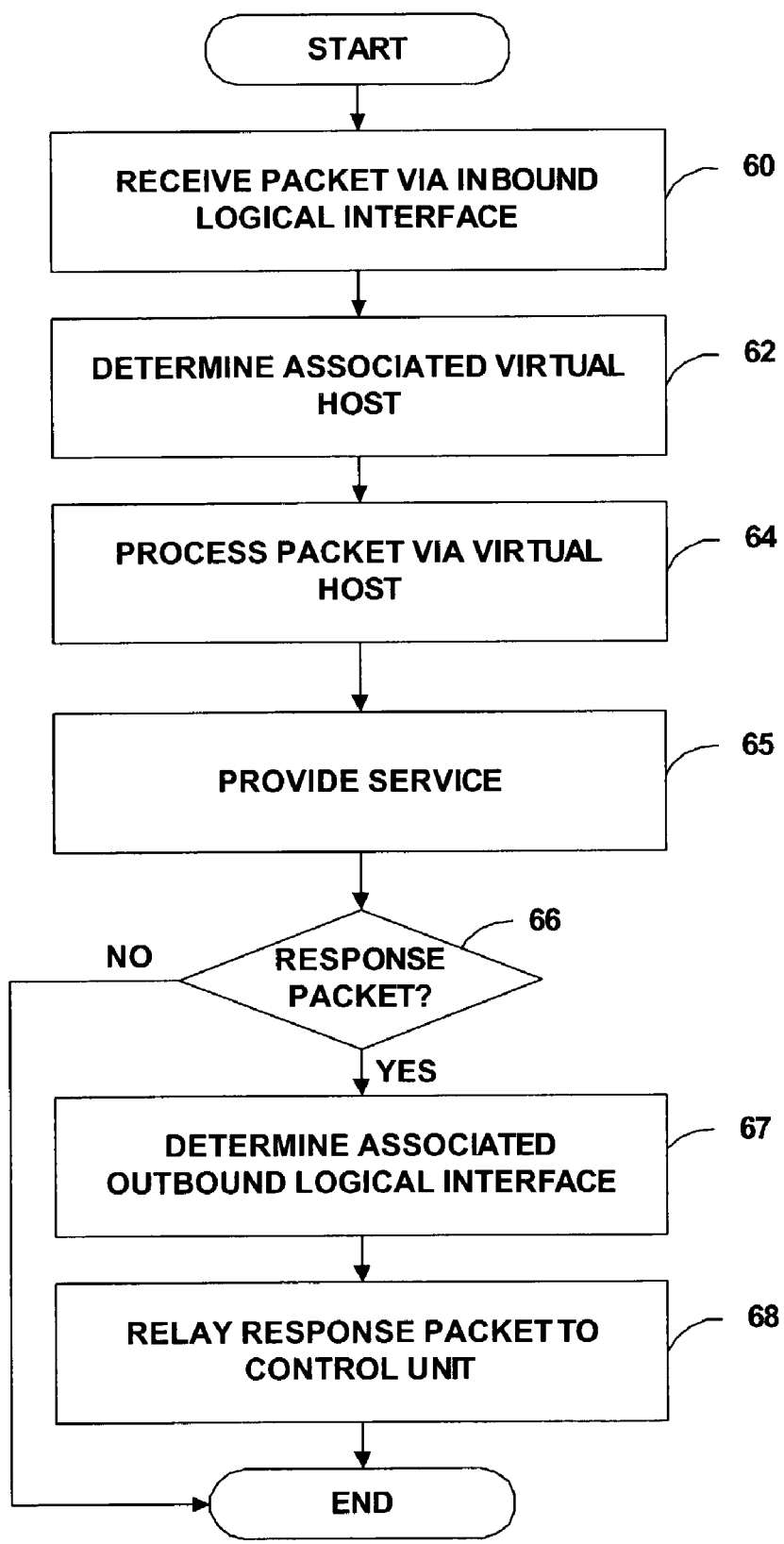
FIG. 5 is a flowchart illustrating an exemplary mode of operation of a service card providing services for multiple VPNs.

FIG. 5 is a flowchart illustrating an exemplary mode of operation of one of service cards 26 providing services for multiple VPNs. By way of example, service card 26A will be used to explain the exemplary mode. Service card 26A receives a packet from control unit 32 via one of input logical interfaces 28 (60). Service card 26A associates the packet with one of virtual hosts 18 (62). For example, the destination address of the packet may be an IP address associated with a particular one of virtual hosts 18. Alternatively, service card 26A may associate the packet with one of virtual hosts 18 based on input logical interface 28 that received the packet. Alternatively, a portion of the packet or a label appended to the packet may be used by service card 26A to map the packet to a particular one of virtual hosts 18.

The one of virtual hosts 18 associated with the packet processes the packet (64), and provides services indicated by the packet (65). For example, service IFC 26A may provide authentication services for a mobile telephone user. The virtual host further determines whether the services provided require any response packets (66). When the services provided do not require response packets the services to the customer are complete. When the services provided do require response packets, the virtual host identifies the associated one of output logical interfaces 30 (66). VPN data 42A may include output logical interfaces 30 associated with the particular VPNs. Service card 26A relays the response packet to control unit 32 via the associated output logical interface 30 (68).

Although described in the context of originating VPN traffic in response to received data, service card 26A may originate VPN traffic that is not in response to received data. For instance, service card 26A may send periodic messages to a server within one of VPNs 13 in order to determine the state of the server.

Figure 6:
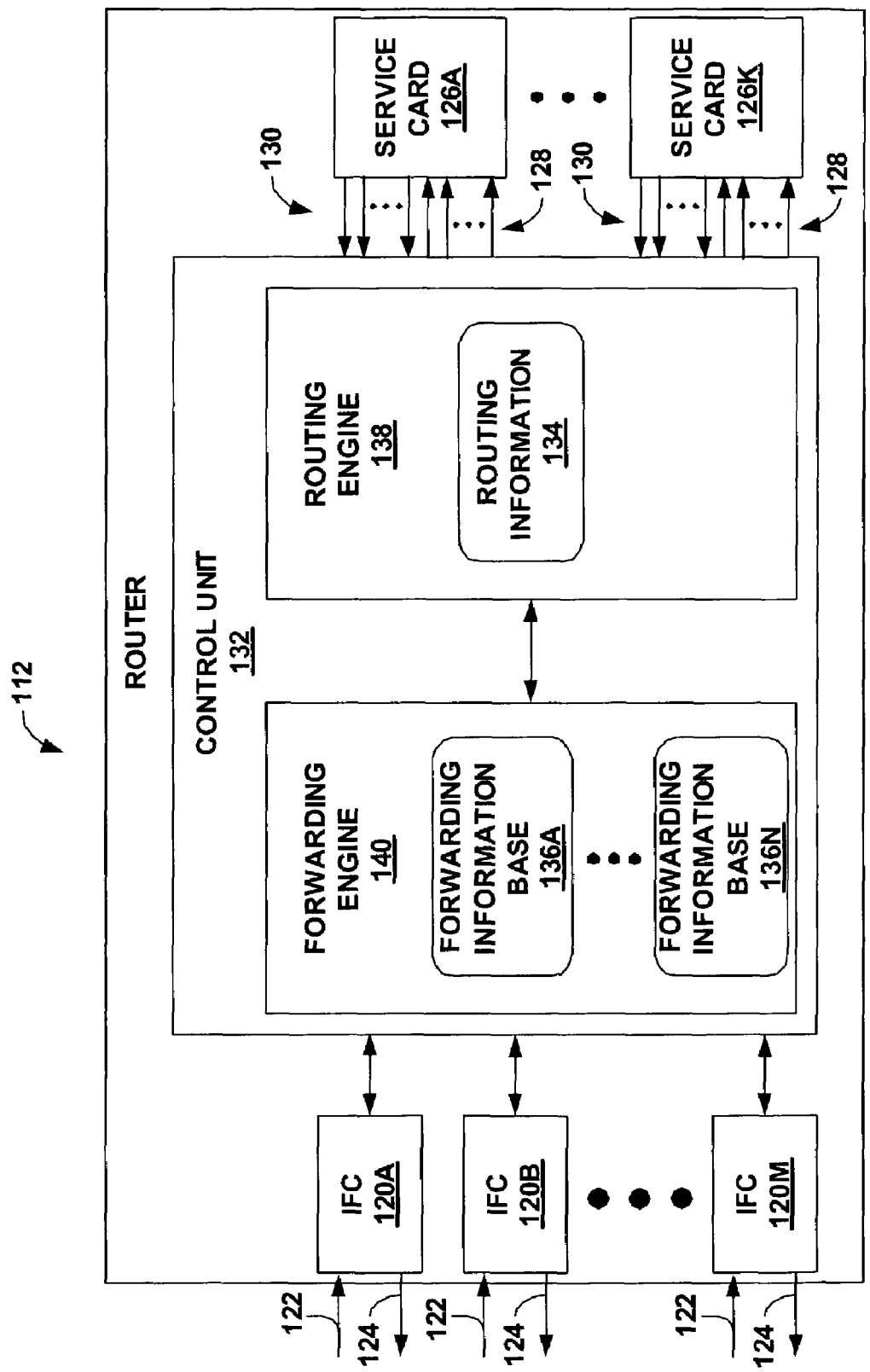
FIG. 6 is a block diagram illustrating another exemplary router that provides services for multiple VPNs.

FIG. 6 is a block diagram illustrating another exemplary router 112 that provides services for multiple VPNs. Router 112 comprises a control unit 132 that includes a routing engine 138 and a forwarding engine 140. Routing engine 138 is primarily responsible for maintaining routing information 134 to reflect the current topology of network 16 and other network entities to which it is connected. In particular, routing engine 138 periodically updates routing information 134 to accurately reflect the topology of network 16 and other entities.

In accordance with routing information 134, forwarding engine 140 maintains forwarding information bases 136A–136N ("forwarding information bases 136") that associates network destinations with specific next hops and corresponding interface ports. Accordingly, as described in detail, forwarding engine 140 relays packets received from IFCs 120A–120M ("IFCs 120") to service cards 126A–126K ("service IFCs 126"). Service cards 126 receive packets from control unit 132, selectively provide services to the customers in accordance with information within the packet, and relay any response packets to control unit 132 for forwarding via one of VPNs 13. In this manner, the router may provide services for multiple customers via VPNs 13.

In one embodiment, each of forwarding engine 140 and routing engine 138 may comprise one or more dedicated processors, hardware, and the like, and may be communicatively coupled by a data communication channel. The data communication channel may be a high-speed network connection, bus, shared-memory or other data communication mechanism. Forwarding engine 140, routing engine 138, or both, may make use of the data structures and organization described above.

Various embodiments of the invention have been described. For example, although packet-based networks are described herein, other types of data units may also be used consistent with the principles of the invention. For instance, the term "packet" is used to generally describe a unit of data communicated between resources in conformance with a communication protocol. The principles of the invention may be readily applied to a variety of protocols, such as Transmission Control Protocol (TCP), the Internet Protocol (IP), Multiprotocol Label Switch (MPLS), Asynchronous Transfer Mode (ATM), Frame Relay, and the like. Accordingly, "packet" is used to encompass any such unit of data, and may be interchanged with the term "cell", or other similar terms used in such protocols to describe a unit of data communicated between resources within the network.

The virtual hosts may also be implemented on service elements other than service cards. For example, one or more virtual hosts may be implemented on service cards within a router, in a device attached directly to a router, in a device attached to a router via a network or other device, or some combination of these. Further, the virtual hosts may be implemented within a control unit of a router. Moreover, network devices other than routers may use service cards as described herein to carry out operations consistent with the principles of the invention.

The invention claimed is:

1. A router comprising:
a plurality of interfaces to receive data from multiple virtual private networks;
a service card to provide an operating environment for one or more virtual hosts; and
a control unit that maintains a forwarding information base that associates network destinations with next hops within a network;
wherein the forwarding information base designates the service card as a next hop to the router within the network,
wherein the control unit forwards virtual private network (VPN) traffic received from the network to the service card as specified in accordance with the forwarding information base, and
wherein each virtual host operates as a network device within one of the virtual private networks to process the received data and provide a service to another network device within the respective virtual private network.

2. The router of claim 1, wherein each virtual host is assigned an address from a subnet of addresses belonging to the respective virtual private network.

3. The router of claim 1, wherein operating as an independent network device within one of the virtual private networks includes operating as a source device for virtual private network traffic.

4. The router of claim 1, wherein operating as a network device within one of the virtual private networks includes operating as a destination device for virtual private network traffic.

5. The router of claim 1, further comprising:
an inbound logical interface to deliver data to the service card; and
an outbound logical interface to deliver data from the service card.

6. The router of claim 5, wherein each virtual host corresponds to at least one inbound logical interface and outbound logical interface.

7. The router of claim 1, wherein each of the virtual hosts maintains virtual private network data that contains information specific to the respective virtual private network.

8. The router of claim 7, wherein the virtual private network data includes at least one of cryptographic information associated with the virtual private network, an output logical interface associated with the virtual private network, a forwarding information base associated with the virtual private network, a radius server within the virtual private network for authentication, domain name information for the virtual private network.

9. The router of claim 1, further comprising a forwarding information base for each of the virtual private networks.

10. The router of claim 1, further comprising a chassis having a plurality of slots to receive and couple the interfaces and the service card to the control unit of the network device.

11. The router of claim 1, wherein the services provided by the virtual hosts includes at least one of authentication services, network address translation (NAT) services, domain name system (DNS) services, print services, and file-sharing services.

12. The router of claim 1, wherein the plurality of interfaces is a plurality of interface cards.

13. A method comprising:
receiving virtual private network traffic from multiple virtual private networks;

providing an operating environment within a service card for one or more virtual hosts, wherein each of the virtual hosts operates as a network device within one of the virtual private networks;

forwarding the virtual private network traffic to the virtual hosts in accordance with one or more forwarding information bases that associate network destinations with next hops in a network, wherein the forwarding information bases designate the service card as a next hop within the network; and processing the virtual private network traffic via the virtual hosts to provide a service to another network device within the respective virtual private network via the virtual hosts.

14. The method of claim 13, further comprising assigning each of the virtual hosts an address from a subnet of addresses belonging to the respective virtual private network.

15. The method of claim 13, wherein each virtual host operating as a network device within one of the virtual private networks includes each virtual host operating as a source device for virtual private network traffic.

16. The method of claim 13, wherein each virtual host operating as a network device within one of the virtual private networks includes each virtual host operating as a destination device for virtual private network traffic.

17. The method of claim 13, further comprising:
maintaining one of the forwarding information bases for each of the virtual private networks; and
forwarding the virtual private network traffic in accordance with the forwarding information bases.

18. The method of claim 13, further comprising communicating with the service card using logical interfaces.

19. The method of claim 18, wherein the virtual private network traffic from each of the virtual private networks is uniquely associated with one of the logical interfaces.

20. The method of claim 18, further comprising dynamically instantiating at least one of the logical interfaces to the service card to service the virtual private networks.

21. The method of claim 20, further comprising destructing at least one of the logical interfaces.

22. A computer-readable medium comprising instructions to cause a processor to:
receive virtual private network traffic from multiple virtual private networks;

provide an operating environment within a service card for one or more virtual hosts, wherein each of the virtual hosts operates as a network device within one of the virtual private networks;

forwarding the virtual private network traffic to the virtual hosts in accordance with one or more forwarding information bases that associate network destinations with next hops in a network, wherein the forwarding information bases designate the service card as a next hop, within the network; and process the virtual private network traffic via the virtual hosts to provide a service to another network device within the respective virtual private network via the virtual hosts.

23. The computer-readable medium of claim 22, further comprising instructions to cause the processor to assign each of the virtual hosts an address from a subnet of addresses belonging to the respective virtual private network.

24. The computer-readable medium of claim 22, further comprising instructions to cause a processor to:
maintain a forwarding information base for each of the virtual private networks; and
forward the virtual private network traffic in accordance with the forwarding information bases.

25. The computer-readable medium of claim 22, further comprising instructions to cause a processor to communicate with the service card using a logical interface.

26. The computer-readable medium of claim 25, further comprising instructions to cause the processor to dynamically instantiate the logical interface to the service card to service the virtual private networks.

27. The computer-readable medium of claim 26, further comprising instructions to cause a processor to destruct the logical interface.

28. The computer-readable medium of claim 22, further comprising instructions that cause the processor to operate one or more of the virtual hosts within the service card as a source device for virtual private network traffic.

29. The computer-readable medium of claim 22, further comprising instructions that cause the processor to operate one or more of the virtual hosts within the service card as a destination device for virtual private network traffic.

* * * * *